Aug. 16, 1966   A. W. LOHMANN   3,267,383
PARTICLE ACCELERATOR UTILIZING COHERENT LIGHT
Filed May 27, 1963   2 Sheets-Sheet 1

*INVENTOR.*
ADOLF W. LOHMANN
BY

ATTORNEY

United States Patent Office 3,267,383
Patented August 16, 1966

3,267,383
PARTICLE ACCELERATOR UTILIZING
COHERENT LIGHT
Adolf W. Lohmann, San Jose, Calif., assignor to International Business Machines Corporation, New York, N.Y., a corporation of New York
Filed May 27, 1963, Ser. No. 283,475
9 Claims. (Cl. 328—33)

The present invention relates to particle accelerators and more particularly to a particle accelerator wherein energy is transferred to particles by means of visible or infrared light waves.

It is known that the kinetic energy of charged particles can be increased by transferring energy from electromagnetic waves to the particles. The final amount of kinetic energy attained by the particles is dependent upon the amplitude of the electromagnetic waves and upon the length of the accelerator. The amplitude of the electromagnetic waves is limited by the electrical breakdown point in the device and, hence, in order to achieve extremely high kinetic energy a very long accelerator is needed. Presently an accelerator two miles in length is being planned.

The electrical breakdown point is much higher for electromagnetic waves in the infrared and visible frequency ranges than for electromagnetic waves in the microwave region. The device of the present invention accelerates particles using electromagnetic waves in the infrared and visible frequency ranges, hence, with the device of the present invention fields of a much higher potential can be obtained thereby allowing the accelerator to be much shorter.

The prior art does show a device for accelerating particles by transferring energy from light waves to the particles. Such a device is described in an article by K. Shimoda in Applied Optics, volume 1, page 33, 1962. In Shimoda's device, electrons are passed through a gas filled chamber and the interaction between the light and the electrons takes place inside of the chamber. The gas is necessary for the operation of his device. The disadvantage inherent in Shimoda's device is that the gas molecules cause the electrons to scatter. In the device of the present invention the interaction between the light and the particles takes place in a vacuum, thereby eliminating the disadvantage inherent in Shimoda's device.

It is known that coherent electromagnetic radiation in the infrared and visible frequency ranges can be generated by passing an electron near a periodic structure. This effect is generally termed the Smith-Purcell effect (see article by S. J. Smith and E. M. Purcell, Physical Review, volume 92, page 1069, 1953 and U.S. Patent 2,634,372, filed by W. W. Salisbury). The devices shown in the prior art to generate coherent light by the Smith-Purcell effect have a flat periodic grating and the electrons are passed over this grating. If one merely attempts to reverse the process using a single flat periodic grating, as the kinetic energy of the electrons increase, less energy is transferred from the light to the electrons thereby establishing a limiting condition which prevents the electrons from being accelerated to very high kinetic energy. In contrast, with the device of the present invention, the amount of energy transferred from the light to the charged particles is substantially independent of the kinetic energy of the particles and, hence, the particles can be accelerated to high speeds.

The object of the present invention is to provide an improved particle accelerator.

Another object of the present invention is to provide a relatively short particle accelerator which can accelerate particles to high velocity.

Yet another object of the present invention is to provide an improved particle accelerator for accelerating particles by transferring energy to the particles from electromagnetic waves in the visible and infrared frequency range.

Yet another object of the present invention is to provide a particle accelerator for accelerating particles optically in which the amount of energy transferred to the particles is not dependent upon the kinetic energy of the particles.

A still further object of the present invention is to provide a means for transferring energy to moving particles in a vacuum from electromagnetic waves in the visible and infrared frequency range.

Yet another object of the present invention is to provide a device for focusing particles in an optical accelerator.

The foregoing and other objects, features and advantages of the invention will be apparent from the following more particular description of preferred embodiments of the invention, as illustrated in the accompanying drawings.

Figure 1:
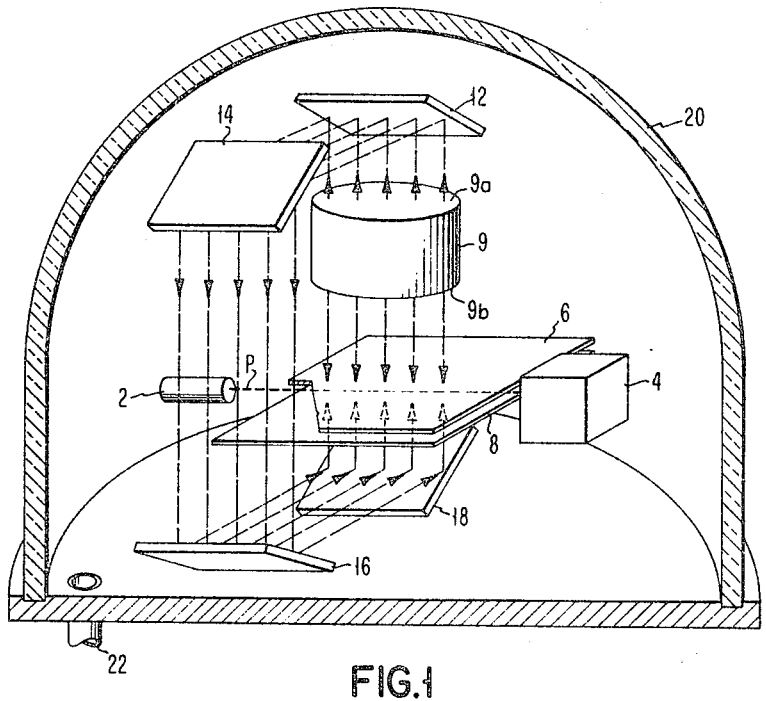
FIGURE 1 shows a first preferred embodiment of the invention.

The first embodiment of the invention shown in FIGURE 1 includes a source of electrons 2, a target 4, a periodic structure formed by diffraction gratings 6 and 8, a laser 9 and four mirrors 12, 14, 16 and 18. The entire device is located in a vacuum chamber 20.

Electron source 2 generates a stream of electrons which are directed between gratings 6 and 8 along the path indicated in FIGURE 1 by the letter P. Diffraction gratings 6 and 8 are mostly transparent; however, they have a large number of opaque lines ruled thereon. These lines are oriented perpendicular to path P.

Laser 9 generates coherent light of a particular wave length and it emits this light from the two faces designated 9a and 9b. The length of the light path from face 9a to grating 8 via mirrors 12, 14, 16 and 18 is longer by an integral number of wave lengths than the path from face 9b to diffraction grating 6. In this manner the light incident upon diffraction grating 8 and the light incident upon diffraction grating 6 are in phase.

When coherent light is incident upon one side of a diffraction grating, it generates evanescent waves on the other side of the diffraction grating. The evanescent waves are electromagnetic waves of the same frequency as the coherent light which is incident upon the gratings and they travel in a plane parallel to the grating and in a direction which is perpendicular to the lines in the gratings (see G. Toraldo di Francia "Electromagnetic Waves," Interscience Publications, 1956). Thus, the coherent light from laser 9 which is incident upon gratings 6 and 8 generates evanescent waves between the gratings. These evanescent waves travel parallel to the path followed by the electrons.

The device operates as follows: Electron source 2 directs a stream of electrons into a space between gratings 6 and 8. The evanescent waves generated by the light from laser 9 accelerates the electrons and they are then incident upon the target 4. Before the device is operated the chamber 20 is highly evacuated by a vacuum pump (not shown) which is attached to opening 22.

Electron source 2 is a conventional source of electrons which continuously directs a stream of electrons between diffraction gratings 6 and 8. Laser 9 (which is only shown schematically in the drawing) is also conventional. It generates coherent light in a narrow band of frequencies centered around a wave length of 2 microns; however, any wave lengths in the general range between 0.5 and 10 microns could alternately be used. The field strength of the light generated by laser 9 is in the vicinity of $10^9$ volts per meter. The area illuminated by the light from laser 9 has a diameter of approximately one inch and gratings 6 and 8 are spaced approximately 10 to 15 microns apart. Using commercially available diffraction gratings having 1,000 lines per inch, the evanescent waves generated between gratings 6 and 8 have a field strength approximately ten or twenty percent less than that of the incident light. In general, for best operation the pitch of the gratings should be about the same as the wave length of the light. With the structure shown, the electrons emitted from source 2 are accelerated by an amount which approximately increases their mass from the rest value to twice the rest mass as they pass through the area illuminated by laser 9. The controls for electron source 2 and for laser 9 are not shown since these controls are conventional. Laser 9 may be a laser which emits coherent light at two surfaces or alternately it may be a laser which emits light at one surface; however, in this case a partially transparent mirror would be used to divide the single beam into the two beams shown on the drawing.

Figure 2:
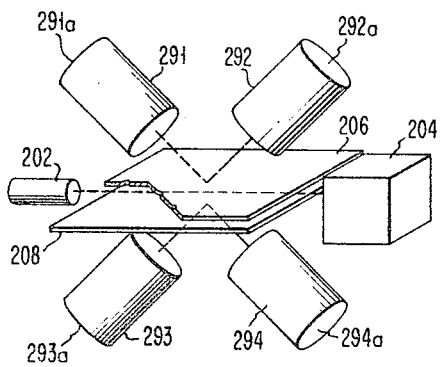
FIGURE 2 shows the second preferred embodiment of the invention.

A second embodiment of the invention is shown in FIGURE 2. The second embodiment includes an electron source 202, two diffraction gratings 206 and 208, a target 204, and a vacuum chamber (not shown), each of which are identical to the corresponding component in the first embodiment. The second embodiment also includes four lasers 291, 292, 293 and 294 which operate in closed sustained oscillation. This is in contrast to the single laser 9 used in the first embodiment of the invention. Generally, in a laser the majority of the light is reflected back and forth between the reflecting ends of the laser and only a small portion of the light escapes from the laser. Each of the lasers 291, 292, 293 and 294 in the second embodiment of the invention only has one reflecting surface, respectively surfaces 291a, 292a, 293a and 294a. The lasers are arranged in pairs, lasers 291 and 292 comprise one pair and lasers 293 and 294 comprise the second pair. All the light from laser 291 is incident upon grating 206. The majority of light incident on grating 206 from laser 291 is reflected into laser 292. The light from laser 292 is reflected in the same way from grating 206 into laser 291. Thus, instead of oscillating between two reflecting surfaces in a single element, the light oscillates between the two elements 291 and 292. Some of the light from lasers 291 and 292 passes through gratings 206 and 208 and it is incident upon lasers 293 and 294. As a result, all four of the lasers 291, 292, 293 and 294 operate in closed sustained oscillation.

The light from lasers 291, 292, 293 and 294 generate evanescent waves between gratings 206 and 208 similar to the manner that the light from laser 9 generated evanescent waves between gratings 6 and 8. The advantage of the second embodiment over the first embodiment is that greater light intensity and hence more accelerating potential can be generated between the diffraction gratings.

Figure 3:
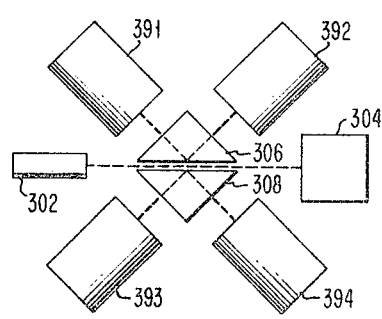
FIGURE 3 shows a third preferred embodiment of the invention.

The third embodiment of the invention shown in FIGURE 3 includes, electron source 302, a target 304, four lasers 391, 392, 393 and 394 and a vacuum chamber 320 (not explicitly shown) which are similar to the corresponding components in the second embodiment of the invention. In the third embodiment of the invention prisms 306 and 308 are substituted for the previously used diffraction gratings. The lasers 391 to 394 are angularly positioned so that relative to the light from each laser the prism would be totally reflecting except for the presence of the other prism. The prisms like the gratings are spaced 10 to 15 microns apart. The principle of operation is exactly the same as that of the other embodiments. That is, the light incident upon prisms 306 and 308 generates evanescent waves between the prisms and these evanescent waves accelerate the electrons which are directed into the space between the prisms by source 302.

In any particle accelerator the electron beam must be properly focused. Techniques for focusing electron beams are well known and it should be understood that though focusing devices are not explicitly shown in FIGURES 1, 2 and 3, the systems shown therein include focusing devices of the type presently used in particle accelerators.

Figure 4:
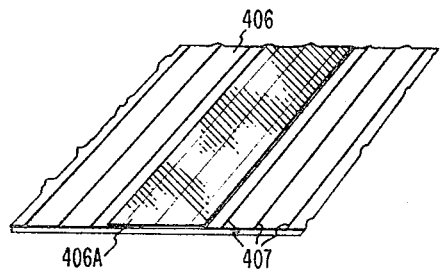
FIGURE 4 shows a first embodiment of a device which can be used to focus the electron beam.
Figure 5:
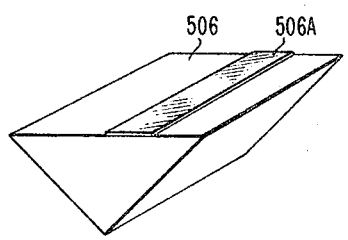
FIGURE 5 shows a second embodiment of a device which can be used to focus the electron beam.

A novel device for focusing electrons in accelerators built according to the present invention is shown in FIGURES 4 and 5. One of the known techniques for focusing electrons in particle accelerators is generally termed the "alternating gradient procedure." In this technique, the electrons are focused by shifting or sliding the particles back and forth relative to the crest of the electromagnetic wave which is traveling in the same direction as the particles. When the particle is in front of the crest of the wave, it is being accelerated and focused in the direction of travel and when the particle is behind the crest of the wave, it is being focused in a direction perpendicular to the direction of travel. In the present system, the phase jump needed to transfer a particle from the front to the back and from the back to the front of the crest of the traveling wave is provided by a discontinuity in the grating or in the prism. Such a discontinuity can be produced by coating a short area of the diffraction grating or prism with a material such as lithium fluoride. The coating should have a thickness in the neighborhood of one tenth the wave length of the incident light. FIGURE 4 shows a portion of a transparent diffraction grating 406 which has a plurality of opaque diffraction lines 407 and an area 406A which is coated with lithium fluoride to provide the necessary discontinuity. FIGURE 5 shows a prism 506 having an area 506A which is coated with lithium fluoride to provide the necessary discontinuity. In general, the coating could be of the type of material used to make lenses antireflective. The same effect could be achieved by having a slight protrusion in the grating or prism or by varying the line spacing in the grating.

The previously described embodiments of the invention each use one or more light sources to generate an accelerating field in one particular area between two periodic structures. Naturally, the total amount of acceleration can be increased by increasing the length of the accelerating field, as is done in conventional microwave accelerators. Since the present accelerator provides a greater amount of acceleration per unit length, the overall length of an accelerator built according to the present invention will be substantially less than that of a comparable conventional microwave accelerator.

Figure 6:
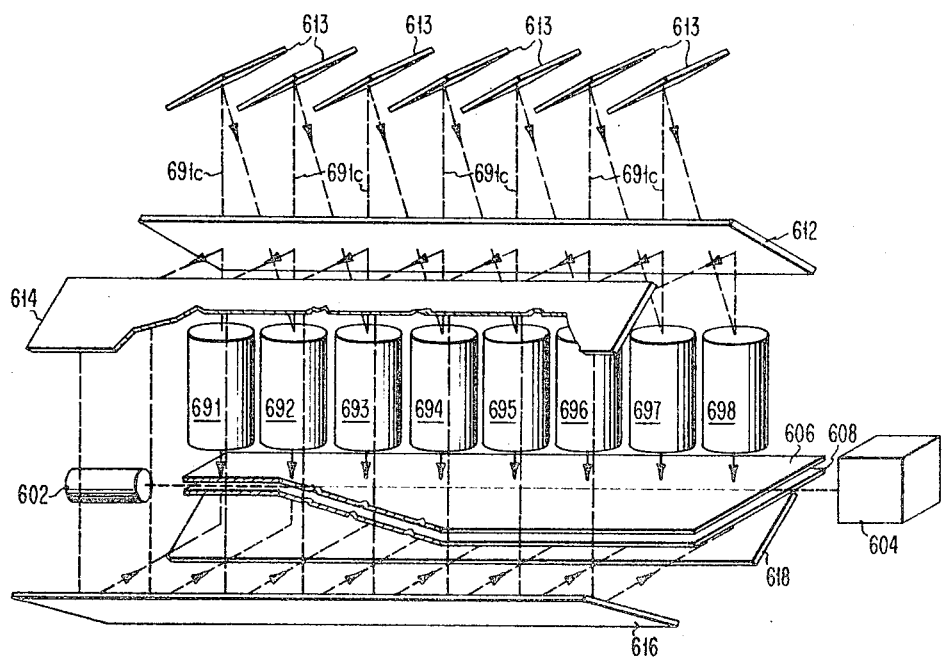
FIGURE 6 shows a fourth preferred embodiment of the invention.

The accelerator shown in FIGURE 6 includes a source of electrons 602, a target 604, four mirrors 612, 614, 616 and 618, seven mirrors 613, two diffraction gratings 606 and 608, and eight synchronized lasers 691 to 698 aligned along the particle path. Each of the lasers 691 to 698 generates an accelerating field similar to the manner that laser 9 shown in FIGURE 1 generates an accelerating field. The total acceleration of the particle passing through the device is the total acceleration derived from each of the lasers. Naturally, to achieve still more acceleration (i.e., to achieve a greater increase in the mass of the particle) the device could be extended by using more lasers.

The manner of synchronizing the various lasers along the path is completely analogous to the manner that microwave sources are presently synchronized in linear accelerators. The phase relationship between the light sources must take into account the time required for the particles to travel between the light sources. The proper phase relationship is established by directing a portion of the light from each laser into the following laser. That is, some of the light from laser 691 is directed to laser 692 via path 691c, some of the light from laser 692 is directed into laser 693 via path 692c, etc. Mirror 612 reflects ninety percent of the light incident from lasers 691 to 698 and it passes the remaining ten percent. The ten percent of light which passes through the mirror 612 from each laser is directed to one of the mirrors 613 and from there into the next laser thereby synchronizing the lasers. The length of the light path from each laser to the next laser is arranged by correctly positioning mirrors 613 so that the lasers have the correct phase relationship. The phase difference between adjacent lasers is equal to the time required for the particle to travel between the lasers.

The diffraction gratings shown herein are flat. It should be understood that the device would operate with structures having other configurations. For example the diffraction gratings could be in the form of a cylinder with the electrons passing through the center of the cylinder. Furthermore, any of the known types of diffraction gratings such as phase gratings could be used.

As used in the appended claims, the term "critical angle" means the angle of reflection for which a refracted ray emerges tangent to the surface. This means that beyond the critical angle a ray is totally reflected internally at the boundary surface. The term "axis of periodicity" refers to an axis which is perpendicular to the structural variation which creates the periodicity. For example, in a line grating, the axis of periodicity is a line which is perpendicular to the opaque lines in the grating.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A device for transferring energy from light waves to charged particles comprising,
   first and second periodically transparent structures, each of said structures having a planar surface, the planar surfaces of said periodic structures being juxtaposed to within several wave lengths of said light,
   means for directing charged particles between said periodically transparent structures, and
   means for directing coherent light through said periodically transparent structures, whereby evanescent wave are generated between said periodic structures, thereby accelerating said charged particles.

2. A device for transferring energy from light waves to charged particles comprising,
   two diffraction gratings positioned near each other, each of said gratings having a planar surface, the planar surfaces of said grating being juxtaposed to within several wave lengths of said light,
   a particle source for directing charged particles between said diffraction gratings,
   a source of coherent light, and
   means for directing said coherent light to the two nonadjacent faces of said diffraction gratings,
   whereby evanescent waves are generated between said diffraction gratings and said particles are accelerated thereby.

3. A device for transferring energy from light waves to charged particles comprising,
   two periodically transparent structures, each of said structures having a planar surface, the planar surfaces of said periodic structures being juxtaposed to within several wave lengths of said light,
   means for directing charged particles between said periodic structures, and
   means for directing coherent light on the nonadjacent surfaces of said periodically transparent structures,
   whereby the particles passing between said periodically transparent structures are accelerated and whereby the amount of energy transferred to said particles from said coherent light is substantially independent of the velocity of said particles.

4. A particle accelerator comprising,
   a source for generating coherent light,
   a particle source for directing charged particles along a particular path, and
   means positioned on at least two sides of said path for generating evanescent waves in response to said coherent light,
   whereby said particles are accelerated.

5. A particle accelerator comprising,
   first and second prisms, one side of said first prism being juxtaposed to one side of said second prism with only a small amount of space therebetween,
   means for directing charged particles into the space between said prisms, and
   a source of coherent light for directing light into said prisms at an angle which exceeds the critical angle of said prisms,
   whereby the particles passing between said prisms are accelerated and whereby the amount of energy transferred to said particles is substantially independent of the velocity of said particles.

6. A device for transferring energy from light waves to charged particles comprising,
   a periodic structure for producing evanescent waves when light is incident thereon,
   a source for directing charged particles along a particular path, said structure having a surface on each side of said path, the surfaces of said periodic structures being juxtaposed to within several wave lengths of said light,
   a light source for directing coherent light into said means, whereby said particles are accelerated.

7. A device for transferring energy from light waves to charged particles comprising,
   a source for directing charged particles along a particular path,
   means for producing evanescent waves located on each side of said path, each of said means having two faces, a first face of each periodic structure facing said path and a second face of each means being exposed, the first surfaces of said periodic structures being juxtaposed to within several wave lengths of said light, and
   means for directing coherent light at said two exposed faces,
   whereby energy is transferred to said particles, the amount of energy transferred being substantially independent of the velocity of said particles.

8. The device recited in claim 1 wherein said means for directing coherent light includes a plurality of synchronized lasers.

9. The device recited in claim 1 wherein at least one of said periodic structures has an area of a discontinuity at a right angle to the axis of periodicity whereby said particles are longitudinally and traversely focused, due to the alternating gradient produced by said discontinuity.

References Cited by the Examiner

UNITED STATES PATENTS 2,688,107  8/1954  Salisbury _____ 315—4

DAVID J. GALVIN, *Primary Examiner.*